United States Patent [19]
Gaeddert et al.

[11] 4,155,298
[45] May 22, 1979

[54] BALE STARTING GATE FOR ROTARY BALER

[75] Inventors: Melvin V. Gaeddert, Newton; Edward L. Swenson, Hesston, both of Kans.

[73] Assignee: Hesston Corporation, Hesston, Kans.

[21] Appl. No.: 779,311

[22] Filed: Mar. 21, 1977

[51] Int. Cl.² .......................... A01F 15/00; B30B 5/04
[52] U.S. Cl. ........................................ 100/87; 56/341
[58] Field of Search .................................. 100/87-89; 56/341-343

[56] References Cited

U.S. PATENT DOCUMENTS

| 3,125,948 | 3/1964 | Redding | 100/88 |
| 3,722,197 | 3/1973 | Vermeer | 100/88 X |
| 3,914,926 | 10/1975 | Braunberger et al. | 56/341 |

*Primary Examiner*—Harvey C. Hornsby
*Assistant Examiner*—John M. Jillions

*Attorney, Agent, or Firm*—Schmidt, Johnson, Hovey & Williams

[57] ABSTRACT

The baling chamber of a rotary baler has an outlet adjacent its front end which must be closed to prevent the escape of crop material when a bale-forming operation is started but must be opened at a certain later point in the operation to allow some materials to escape. A gate disposed within the path of crop flow through the outlet can be shifted between a closed position completely blocking the egress of material and an opened position in which the gate is substantially on edge with respect to the crop flow so as to permit the unhindered movement of crop material through the outlet. The gate is hinged to a stationary scraper that discourages wrapping of crop material around an adjacent roller, and movement of the gate is coordinated with enlargement of the baling chamber during formation so that the gate is opened after the chamber reaches a predetermined size.

14 Claims, 6 Drawing Figures

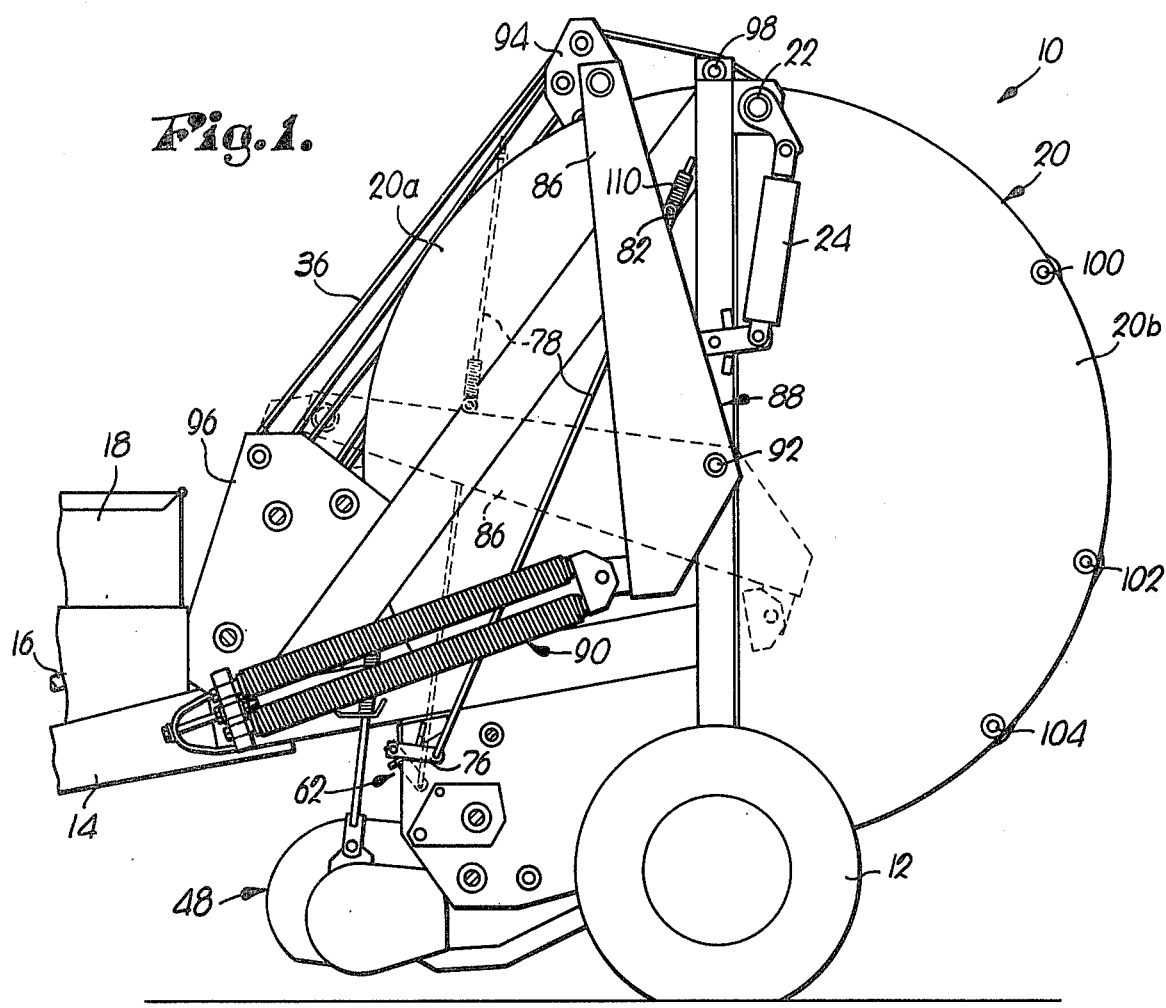
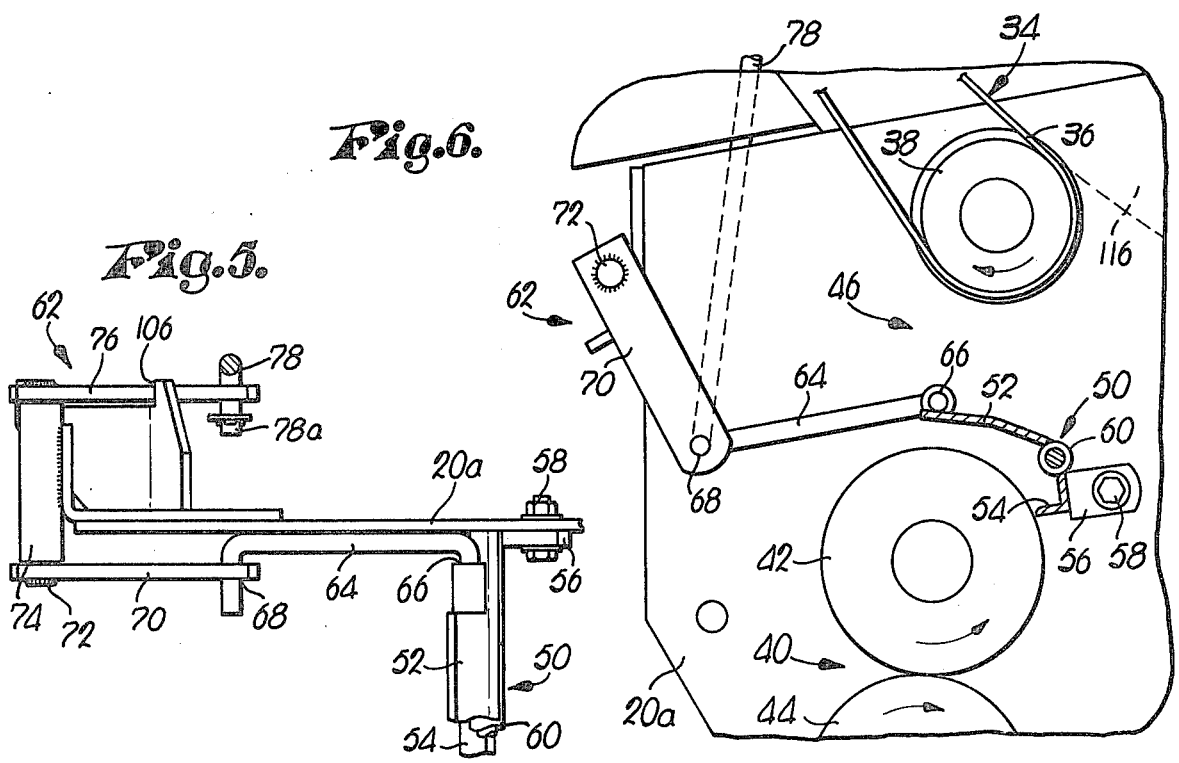

BALE STARTING GATE FOR ROTARY BALER

This invention relates to an improvement in gate structure of the type found in the rotary baler U.S. patents of Vermeer, Nos. 3,722,197, and Braunberger, et al, 3,914,926. Such structure is used to selectively open and close a crop escape outlet at the front end of the baling chamber of such machines. While it is important to have the outlet closed during initial bale starting so that the bale rolling mechanism within the chamber does not simply kick incoming material back out the outlet, it is also important to open the outlet at some later point in the baling cycle in order to permit the escape of material that might otherwise become wedged within the various "pinch points" and trash collecting areas associated with the chamber.

An important object of the present invention is to provide an improvement over prior mechanisms of this type with respect to simplicity, reliability and effectiveness.

Another important object of this invention is to provide an improved way of coordinating opening and closing of the gate structure with enlargement of the baling chamber so as to have the gate in the proper position at the proper time but without adversely affecting the operation of the bale rolling mechanism or the way in which the chamber is progressively enlarged.

An additional important object of this invention is to combine the outlet control function and a roller cleaning or trash clearing function in a single, compact assembly that is capable of carrying out both functions without compromising either. In this regard, it is an important provision of the present invention that the scraping function is carried out during the totality of the baling cycle rather than only during that portion in which the outlet is closed by the gate structure. While stationary scrapers for crop engaging rolls in rotary balers are not new per se, to the best of our knowledge, they have never been so combined and integrated into a single assembly with gate structure of the character herein described as to be capable of carrying out the principles of the present invention.

In the drawings:

FIG. 1 is a fragmentary side elevational view of a rotary baler constructed in accordance with the principles of the present invention;

FIG. 5 is a fragmentary cross-sectional view of another portion of one of the control linkages for the gate structure taken along line 5—5 of FIG. 3; and FIG. 6 is an enlarged, fragmentary elevational view similar to FIG. 2 but illustrating the gate in its opened position.

Figure 2:
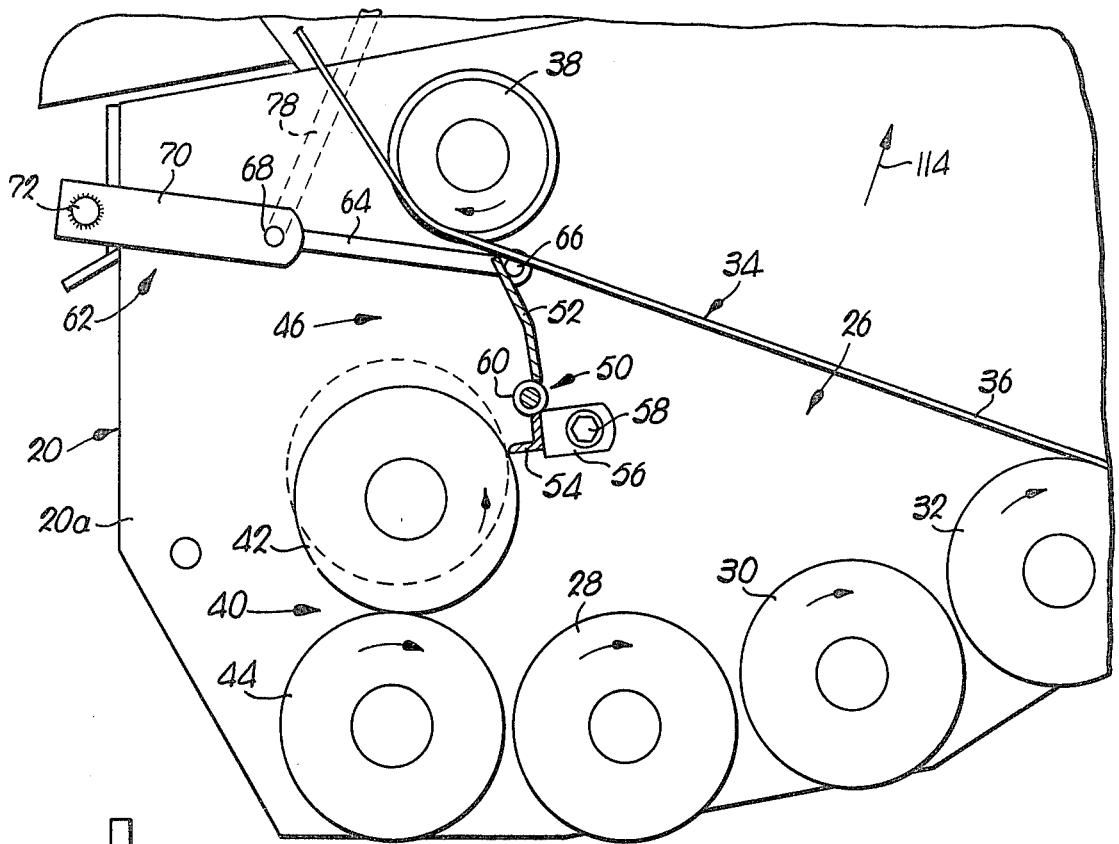
FIG. 2 is an enlarged, fragmentary side elevational view of the inside of the baler illustrating details of construction.

The baler 10 is supported for over-the-ground travel by its ground wheels 12 and is adapted for towing by a tractor or the like (not shown) through a forwardly extending tongue 14. Power for driving the various mechanisms of the baler 10 may be derived from a shaft 16 above the tongue 14 and leading from the towing vehicle. A box 18 also supported on the tongue 14 may house a supply of twine (not shown) for binding a bale once the latter has been completely formed by the baler 10.

Each circular side 20 of the baler 10 is divided into a front half 20a and a rear half 20b, the latter being pivoted to the front half 20a by a pivot 22 at the top of the baler 10. Consequently, the rear halves 20b may be raised about the pivot 22 by a power device 24 for unloading of a finished bale.

The two sides 20 cooperate to define the lateral boundaries of an internal baling chamber 26 having an initial basically triangular configuration when viewed in vertical cross-section as illustrated in FIG. 2. The floor of the chamber 26 is defined by three rollers 28, 30 and 32 spinning the sides 20 and rotated in a clockwise direction viewing FIG. 2. The top of the chamber 26 is defined by a stretch 34 of a continuous web defined by a series of laterally spaced-apart, endless rubber belts 36 (FIG. 3), the belts 36 normally being driven upwardly and forwardly as viewed in FIG. 2 by virtue of a drive roller member 38 having a clockwise direction of rotation as viewed in FIG. 2. As illustrated in FIG. 2, the web stretch 34 and the floor defined by the rollers 28, 30 and 32 converge rearwardly when the chamber 26 is empty so that the stretch 34 is quite closely adjacent the upper periphery of the rearmost roller 32. Consequently, the rear of the chamber 26 is completely closed.

The front of the chamber 26 has two openings, one in the form of a nip 40 between a pair of superimposed compression roller members 42 and 44, and the other in the form of an outlet 46 between the upper compression roller 42 and the drive roller 38. The compression rollers 42 and 44 are oppositely driven as in FIG. 2 so that ground lying crop material lifted by a crop pickup 48 (FIG. 1) and delivered to the nip 40 is fed rearwardly by the rollers 42, 44 into the chamber 26. The upper compression roller 42 is floatingly supported by mechanism not illustrated for movement between the two extreme positions illustrated in FIG. 2 in order to increase or decrease the size of the nip 40 as may be necessary to accommodate the stream of materials passing between the rollers 42, 44.

Figures 3, 4:
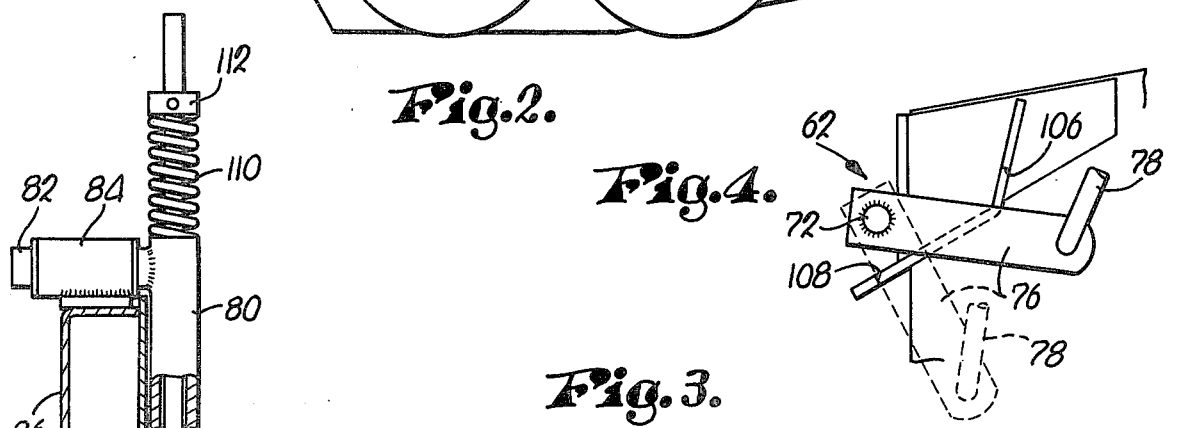
FIG. 3 is an enlarged, fragmentary front elevational view thereof.
FIG. 4 is an enlarged, fragmentary detailed view of part of the control linkage for the gate structure.

Opening and closing of the outlet 46 is controlled by a two-part assembly broadly denoted by the numeral 50. One part of the assembly 50 includes a gate 52 in the nature of a slightly bent panel the extends substantially the full width of the baler 10 between the front halves 20a of the sides 20 as illustrated in FIG. 3. The other part of the assembly 50 comprises a reversely L-shaped scraper 54 (as viewed from FIG. 2) that also spans the chamber 26 below the gate 52 and in extremely close, rearward proximity to the periphery of the upper roller 42. Ears 56 at opposite ends of the scraper 54 (only one being illustrated) attach the scraper 54 to the sides 20 through bolts 58 so that the scraper 54 is more or less permanently and stationarily mounted in place.

The gate 52 and the scraper 54 are interconnected by a hinge 60 extending the full length of the assembly 50. This permits swinging of the gate 52 between a generally vertical, closed position as illustrated in FIG. 2 wherein the gate 52 completely closes off the outlet 46, and a generally horizontal, opened position as illustrated in FIG. 6 wherein the gate 52 is substantially edgewise to the flow of material out of the outlet 46 such as to open the latter. Movement of the gate 52 from its closed to its opened position is thus downwardly and forwardly, or, in other words, away from the activity taking place within the baling chamber 26.

Movement of the gate 52 about the hinge 60 is regulated by a pair of identical control means 62 on opposite sides of the baler 10. Each control means 62 includes a short fore-and-aft link 64 having a rear pivot 66 with one end of the gate 52 and a front pivot 68 with a crank 70. Each crank 70 is, in turn, rigidly affixed to one end of a short, transversely extending crank shaft 72 rotatably housed within a stationary, transverse sleeve 74. The opposite end of the crank shaft 72, lying outside the corresponding sidewall 20a, is rigidly affixed to a rearwardly extending crank 76 that is parallel to and is disposed at the same attitude as the first crank 70. A push-pull rod 78 has a lower inturned end 78a thereof pivoted to the rearmost end of the crank 76, the rod 78 extending generally upwardly and rearwardly from its pivotal connection to the crank 76 to a point near the top of the baler 10.

Each rod 78 slidingly passes through a tube 80 having a pivot stub 82 projecting laterally therefrom. The stub 82 is received within a horizontally disposed bearing 84 that is in turn rigidly attached to a corresponding one arm 86 of a device 88 that controls the tension of the belts 36, stores a slack supply of the latter, and operates to pay out such supply as necessary to increase the effective length of the stretch 34 when the bale chamber is enlarged during formation of a bale as described hereinbelow.

The devices 88, in addition to the two arms 86 on opposite sides of the baler 10, include a set of springs 90 for each arm 86, respectively, that biases the latter upwardly and rearwardly about its mounting pivot 92. Note in FIG. 1 that the solid line position of the arm 86 represents its normal position at the beginning of a baling cycle corresponding to the condition of things in FIG. 2, while the dotted line position of the arm 86 in FIG. 1 corresponds to its fully actuated position wherein a bale within the chamber 26 is completely formed. That latter condition is illustrated by the condition of things as shown in FIG. 6.

A multi-roller unit 94 spans the arms 86 at the uppermost ends of the latter and serves as one part of the belt take up portion of the unit 88, the other portion consisting of a multi-roller support 96 at the front of the machine and normally spaced below the unit 94. The belts 36 are threaded around and among the various rollers of the unit 94 and the support 96 in such a way that when the arms 86 are fully raised as in FIG. 1, all of the slack is taken up such that the web stretch 34 has a length corresponding to that illustrated in FIG. 2. On the other hand, when the arms 86 are fully down as illustrated in dotted lines of FIG. 1, the slack is fully paid out such that the web stretch 34 may be extended in length many times over so as to wrap around virtually the top 325 degrees of a bale which has formed within the chamber 26.

From the device 88, the belts 36 extend rearwardly generally around the circular periphery of the baler 10, supported in such positions by a series of rollers 98, 100, 102 and 104. An additional belt supporting roller (not shown) is located at the bottom of the rear half 20b of the sides 20 in alignment with the ground wheels 12, such roller providing the downward and rearward inclination to the web stretch 34 illustrated in FIG. 2. From that roller, the belts extend upwardly and forwardly to top the chamber 26 where, at the forward end of the latter, they are engaged by the drive roller 38. From that location they extend upwardly and forwardly into the network of rollers associated with the support 96 and the unit 94.

By virtue of the slip tubes 80 on the arms 86, the connection between the push-pull rods 78 and the arms 86 is in the nature of a lost motion connection. This is required when a comparison is made between the relatively large distance covered by each arm 86 during its movement and the relatively short distance covered by the gate 52 during its movement from a closed to an opened position. In fact, there is no positive, force-transmitting connection as such between the arms 86 and the corresponding rods 78 inasmuch as the tubes 80 are free to slide downwardly along the rods 78 when the arms 86 are so swung. The force of gravity, coupled with any binding between the rods 78 and the tubes 80 as a result of their geometrical relationship, serves as the means for lowering the rods 78 and, hence, swinging the gate 52 from its closed to its opened position. As will later become apparent, the forwardly directed force of a growing bale within the bale chamber 26 also has a tendency to open the gate 52.

The gate 52 is limited to movement between its two extreme positions illustrated in FIG. 2 on the one hand and FIG. 6 on the other, by virtue of opposed limit stops 106 and 108, respectively (FIGS. 4 and 5), that are disposed for engagement with the outer crank 76 associated with each rod 78. A coil spring 110 surrounds each rod 78 above the tube 80 and is free to move along its corresponding rod 78 between the tube 80 on the one hand, and a set collar 112 fixed to the upper end of the rod 78 on the other. Consequently, as the arms 86 are returned upwardly to their home positions, the tubes 80 engage the springs 110 which in turn ultimately butt up against their collars 112 so as to provide a yieldable pulling action against the gate 52 through the rods 78 to maintain the gate 52 in its closed position of FIG. 2.

OPERATION

With the arms 86 fully raised in their home positions, components on the inside of the baler 10 assume the relationships illustrated in FIG. 2. The outlet 46 is fully closed by the gate 52 at this time.

As the baler 10 is advanced and crop material is fed rearwardly into the chamber 26 by the pickup 48 and the compression rollers 42, 44, such material is exposed to a rearwardly directed, underlying force from the rollers 28, 30 and 32 and to a generally forwardly directed, overlying force from the web stretch 34. Consequently, the material starts tumbling forwardly and would be immediately kicked through the outlet 46 by the forwardly moving web stretch 34 were the outlet 46 not fully closed by the gate 52. Because of such closure, however, all the material is retained within the chamber 26 to assure that a bale will in fact begin to form.

As additional material continues to be delivered into the chamber 26, the growing bale starts to deform the belts 36 upwardly and rearwardly in the direction of the arrow 114 in FIG. 2. Such deflection is resisted by the device 88, more particularly by the tension springs 90 in conjunction with the arms 86, and this provides the compaction force necessary to create a solid, well densified bale.

The resistance of the springs 90 is eventually overcome, however, and the growing bale deflects the belts 36 sufficiently to cause the web stretch 34 to lengthen as the arms 86 swing downwardly to pay out the stored supply of slack belting. Eventually, the stretch 34 will be so lengthened as to use up substantially all of the slack supply and cover the top 325 degrees of the finished bale, at which time the belts 36 may be wrapped substantially around the drive roller 38 as illustrated in FIG. 6. A small portion of the finished bale is illustrated in broken lines in that fig. and is denoted by the numeral 116.

During the time that the growing bale deflects the belts 36 upwardly into the reaches of the baler 10, the gate 52 is allowed to swing downwardly by gravity and otherwise to its fully opened position illustrated in FIG. 6 in view of the fact that the arms 86 swing downwardly so as to move the tubes 80 away from the set collars 112. With the gate 52 opened, trash and errant crop material that might otherwise tend to jam in "pinch point" areas associated with the chamber 26 are free to leave the latter through the outlet 46, it being apparent that only a relatively small amount of such material actually departs from the chamber 26 compared to the overall size of the bale when it is considered that the rotating bale itself tends to pick up incoming material and draw it upwardly along its rear extremity against that portion of the web stretch 34.

Some of the material needing to be released from the chamber 26 comes from that material which tends to wrap around the upper compression roller 42 but is immediately discouraged from doing so by the scraper 54. Frequently, this material refuses to be carried rearwardly with the mainstream of material along the rollers 28, 30 and 32, such that it must be immediately disposed of in order to prevent excessive buildup and ultimate malfunction of the machine.

It should also be apparent that the problem of wrapping the upper compression roll 42 with crop material must be dealt with throughout the totality of the baling cycle, not just during bale starting. Consequently, one important advantage of the present invention is realized in that although the gate 52 is opened somewhere in mid cycle, the scraper 54 remains always in position to discourage wrapping. This has not always been the case on prior machines where the starting gate was attempted to be used also as a scraper and its scraper function ceased as soon as the gate opened.

Once the bale has been fully formed it may be wound if desired by twine from the supply box 18. Thereupon, the rear halves 20b of the sides 20 are elevated through cylinders 24 to eject the bale and allow the same to drop onto the ground. The belts 36 are thereby relaxed, allowing the springs 90 to return the arms 36 to their upper positions as the rear halves 20b are returned to their original position as illustrated in FIG. 1. Such movement of the arms 86 causes the gate 52 to be returned to its closed position through a pulling action on the rods 78 so as to rock the cranks 70, 76 upwardly from their dotted line position of FIG. 4 to their solid line position of the same fig., thereby pushing rearwardly on the links 64.

Having thus described the invention, what is claimed as new and desired to be secured by Letters Patent is:

1. In a rotary baler having a baling chamber that is provided with a crop outlet between a pair of spaced members, means for selectively opening and closing said outlet comprising:
    a gate;
    means at said outlet mounting said gate for movement within the path of crop flow therethrough between a closed position substantially opposed to said flow and an opened position substantially edgewise to said flow,
    said gate remaining at the outlet in both of said positions; and
    means for controlling said movement.

2. In a rotary baler as claimed in claim 1, wherein said mounting means includes a pivot for said gate.

3. In a rotary baler as claimed in claim 2, wherein said pivot is located within the area occupied by said chamber and said outlet.

4. In a rotary baler as claimed in claim 3, wherein said outlet is generally vertically defined, said gate being generally vertically disposed when in said closed position and being generally horizontally disposed when in said open position.

5. In a rotary baler as claimed in claim 1, wherein said chamber is defined at least in part by means that permit the chamber to enlarge as a bale is formed therein, said control means and said chamber-defining means being operably interconnected for closing said outlet when the chamber is smaller than a predetermined size and for opening said outlet when the chamber is larger than said predetermined size.

6. In a rotary baler as claimed in claim 5, wherein said chamber-defining means includes a drivable web stretch that is extendible under resistance to effect said enlargement of the chamber, said stretch having a shiftable device associated therewith for use in storing and paying out additional lengths of the web for extending said stretch, said control means including linkage between said gate and said device.

7. In a rotary baler as claimed in claim 6, wherein said linkage and said device are provided with a lost-motion connection therebetween for permitting continued shifting of said device after the gate has been moved to said opened position.

8. In a rotary baler as claimed in claim 7, wherein said gate is provided with a pair of limit stops associated therewith corresponding to opposite ones of said positions for precluding movement of the gate beyond said positions.

9. In a rotary baler as claimed in claim 1, wherein at least one of said members comprises a crop-engaging roller; and a scraper associated with said gate in close proximity to the periphery of said roller for clearing said periphery of collected crop materials.

10. In a rotary baler as claimed in claim 9, wherein said scraper is fixed against movement with the gate, there being a hinge connection between the gate and the scraper.

11. In a rotary baler as claimed in claim 10, wherein said chamber is defined at least in part by means that permit the chamber to enlarge as a bale is formed therein, said control means and said chamber-defining means being operably interconnected for closing said outlet when the chamber is smaller than a predetermined size and for opening said outlet when the chamber is larger than said predetermined size.

12. In a rotary baler having a baling chamber that is provided with a crop outlet between a pair of spaced members, at least one of which is a crop-engaging roller, a crop flow control assembly comprising:
    a first part disposed across said outlet for closing the same against crop flow therethrough;
    a second part disposed closely adjacent the periphery of said roller for discouraging the wrapping of crop materials around the roller;
    a hinge connection between said parts, rendering said first part swingable out of said closing relationship with the outlet; and means for controlling said swinging, said first part being swingable between a pair of extreme positions within the path of crop flow through the outlet, said first part in one of said positions being opposed to said crop flow and in the other of said positions being substantially edgewise to the crop flow, said first part comprising an at least substantially imperforate panel.

13. In a rotary baler having a baling chamber that is provided with a crop outlet between a pair of spaced members, at least one of which is a crop-engaging roller, a crop flow control assembly comprising:

a first part disposed across said outlet for closing the same against crop flow therethrough;

a second part disposed closely adjacent the periphery of said roller for discouraging the wrapping of crop materials around the roller;

a hinge connection between said parts, rendering said first part swingable out of said closing relationship with the outlet; and means for controlling said swinging, said chamber being defined at least in part by means that permit the chamber to enlarge as a bale is formed therein, said control means and said chamber-defining means being operably interconnected for closing said outlet when the chamber is smaller than a predetermined size and for opening said outlet when the chamber is larger than said predetermined size, said chamber-defining means including a drivable web stretch that is extendible under resistance to effect said enlargement of the chamber, said stretch having a shiftable defice associated therewith for use in storing and paying out additional lengths of the web for extending said stretch, said control means including linkage between said first part and said device, 14. In a rotary baler as claimed in claim 13, wherein said first part is swingable between a pair of extreme positions within the path of crop flow through the outlet, said first part in one of said positions being opposed to said crop flow and in the other of said positions being substantially edgewise to the crop flow.

* * * * *